March 1, 1955　　　E. F. WEBB　　　2,703,127
FLUID RESERVOIR FOR VEHICLE WINDSHIELD CLEARING SYSTEMS
Filed Oct. 17, 1952
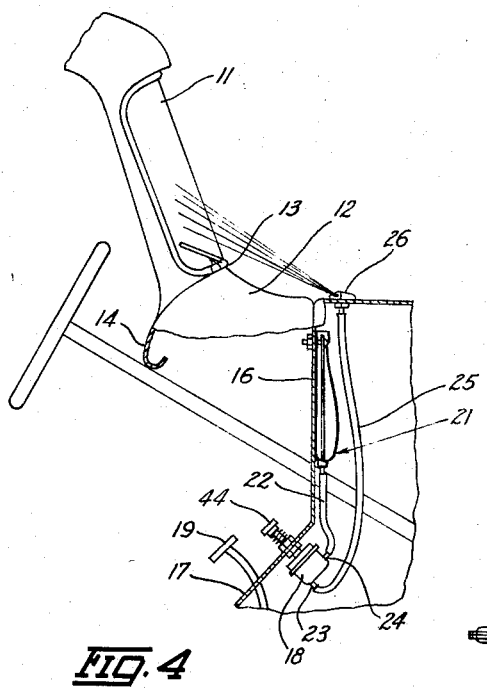
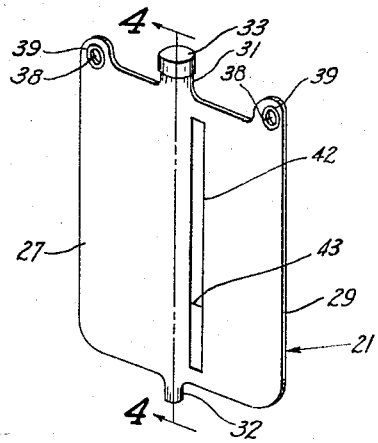
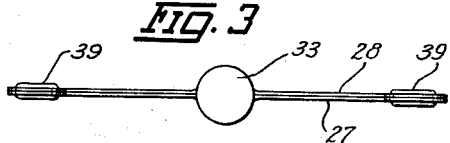
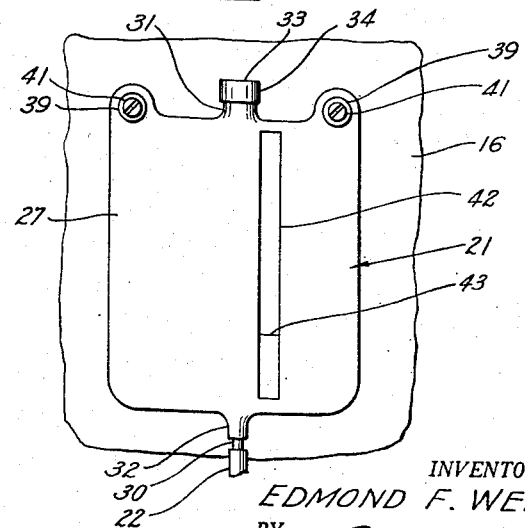
INVENTOR.
EDMOND F. WEBB
BY
ATTORNEY.

United States Patent Office 2,703,127
Patented Mar. 1, 1955

2,703,127

FLUID RESERVOIR FOR VEHICLE WINDSHIELD CLEARING SYSTEMS

Edmond F. Webb, Franklin, Mich., assignor to The Delman Company, Des Moines, Iowa, a partnership Application October 17, 1952, Serial No. 315,238

2 Claims. (Cl. 150—1)

This invention relates generally to automobile windshield clearing systems and more particularly to fluid reservoirs embodied in such systems.

Presently commercially available windshield clearing systems include a glass reservoir or container for storing the fluid which is to be projected onto the windshield. However, these glass containers are unsatisfactory for a number of reasons. For instance, the glass container or jar is usually carried on a mounting bracket that is attached to the automobile fire wall so as to be subject to rattling. Also, these glass containers are subject to breakage in shipment of the systems, during service work on the automobile engine, and in the freezing of the fluid in the container in cold weather.

An object of this invention, therefore, is to provide an improved fluid reservoir for use in a windshield clearing system.

A further object of this invention is to provide an unbreakable fluid reservoir constructed of a flexible plastic material.

Another object of this invention is to provide a fluid reservoir constructed of a flexible plastic material and attachable directly to the fire wall of the automobile without sagging.

A further object of this invention is to provide a flexible fluid reservoir constructed so as to be capable of continual use over a prolonged service life.

A further object of this invention is to provide a fluid reservoir constructed of a flexible plastic material and including a means for indicating the fluid level in the reservoir.

Yet another object of this invention is to provide a fluid reservoir which is compact and rugged in construction, economical to manufacture, and readily installed in windshield clearing systems now in use.

Further objects, features and advantages of this invention will become apparent from a consideration of the following description when taken in connection with the accompanying drawings in which:

Fig. 1 is a fragmentary foreshortened longitudinal sectional view of a vehicle showing assembled thereon a windshield clearing system embodying the fluid reservoir of this invention;

Fig. 2 is a perspective view of the fluid reservoir;

Fig. 3 is a top plan view of the fluid reservoir;

Fig. 4 is an enlarged sectional view of the fluid reservoir looking along the line 4—4 in Fig. 2; and Fig. 5 is an enlarged fragmentary front elevational view of the fire wall and fluid reservoir assembly shown in the system of Fig. 1.

With reference to the drawing, there is illustrated in Fig. 1 a windshield clearing system as applied to an automobile having a windshield 11, an engine cowl 12 curved downwardly and forwardly from the lower front edge 13 of the windshield 11, and an instrument panel or dashboard 14 located rearwardly of the windshield 11. The automobile is further equipped with the usual fire wall 16 and an upwardly and forwardly inclined floor board section 17 which joins with the lower end of the fire wall 16.

The clearing system includes a pump unit 18 supported from the floor board section 17 at a position adjacent to a vehicle pedal 19 and a liquid container or reservoir 21 carried on the front side of the fire wall 16. The pump 18 is of the type having a fluid inlet connection 24 with a one-way check valve (not shown) disposed therein and a fluid outlet connection 23 similarly provided with a one-way check valve (not shown). A flexible tube 22 connects the inlet connection 24 with the fluid reservoir 21 while a second flexible tube 25 extends from the pump outlet connection 23 to a fluid discharge or nozzle unit 26 connected to the automobile adjacent the windshield 11.

The fluid reservoir 21 includes a front side wall member 27 made of a flexible and somewhat elastic transparent plastic material and a rear side wall member 28 constructed of a non-stretchable fibre cloth impregnated with plastic. The wall 28 is thus flexible but non-elastic. The members 27 and 28 are heat sealed together in fluid tight engagement along their peripheral edges 29. Formed in the top end of the reservoir 21 at a substantially central location is an upright relatively stiff tubular member 31 of a heavier construction than the wall members 27 and 28, which functions as a filling inlet for the reservoir 21. Removably carried on the open top end of the inlet 31 is a closure cap 33 having a depending flange 34 frictionally engageable with the upright wall of the inlet 31. A downwardly depending outlet connection 32 is integrally formed at the bottom end of the reservoir 21 at a substantially central position for receiving a tubular coupling 30 which carries the flexible tube 22. To mount the reservoir 21 on the firewall 16, two pairs of aligned openings 38 are formed in the wall members 27 and 28 at spaced positions adjacent the upper ends thereof for receiving metal grommets 39.

In the assembly of the fluid reservoir 21 on the automobile, a pair of screws 41 are extended through the grommets 39 and into the fire wall 16 for supporting the reservoir 21 in an upright position with the back wall member 28 against the front side of the fire wall. In this assembly the screws 41 are applied while the back wall 28 is flat against the fire wall 16. By virtue of the non-elastic fibre cloth in the back wall 28 the reservoir 21 is without any sag between the mounting screws 41. However, with the front wall 27 being formed of an elastic plastic material, expansion of the reservoir 21, as caused by its being filled with fluid, is permitted by the front wall 27. The rear wall 28, therefore, by virtue of its non-elastic construction provides for a substantially solid support of the reservoir 21 on the fire wall 16, and with the expansion of the reservoir, when filled with liquid, being in a direction laterally of the reservoir.

Further, since the front wall 27 is constructed of a transparent plastic material the level of the fluid in the reservoir is readily visible. To further aid in the observation of the level of the fluid in the reservoir 21, the outer surface of the front wall 27 is coated or covered with a thin mask of a non-transparent plastic material, except for a vertically extended elongated area 42 which is left uncoated so as to function as a liquid level gauge. A horizontal line or other marking 43 is formed on the area 42 near the lower end thereof to indicate to the user that the reservoir 21 needs re-filling when the liquid falls below the level of the line 43.

In the operation of the windshield clearing system, a foot operated plunger 44 for the pump 18 is actuated to force fluid under pressure through the flexible tube 25 and into the fluid discharge unit 26. During this actuation of the foot plunger 44, the check valve in the pump outlet connection 23 is opened concurrently with a closing of the valve in the pump inlet connection 24. The fluid from the unit 26 is discharged, through a pair of orifices formed in the unit 26, as jets of fluid directed against the windshield 11 and into the path of the usual windshield wipers associated therewith. When the plunger 44 is released, fluid is drawn from the reservoir 21 through the flexible tube 22 into the pump 18. During the upward movement of the plunger 44 the valve in the pump inlet connection 24 is opened concurrently with a closing of the valve in the outlet connection 23. In other words, fluid is discharged from the unit 26 when the plunger 44 is depressed and drawn into the pump 18 for subsequent discharge, when the plunger 44 is released.

From the above description it is seen that a flexible plastic fluid reservoir is provided which eliminates any danger of the reservoir being broken and any rattling of the reservoir against adjacent parts of the automobile. The reservoir 21 is directly secured to the fire wall 16 with the grommets 39, with the back wall 28 holding the reservoir against sagging between the grommets 39.

Although the invention has been described with respect to a preferred embodiment thereof, it is to be understood that it is not to be so limited since changes can be made therein which are within the full intended scope of this invention as defined by the appended claims.

I claim:

1. For use in a windshield clearing system for an automobile, a fluid container adapted to be attached to the fire wall of the automobile, said container comprising a pair of side walls positioned adjacent each other in a back to back relation, said walls being in a fluid sealed relation with each other along their corresponding edges whereby to form a fluid chamber between said walls, with one of said walls being constructed of a flexible and stretchable plastic material and the other of said walls being constructed of a non-stretchable fibre cloth impregnated with plastic, a fluid inlet formed on said container adjacent the top end thereof, a fluid outlet for said container, and an elongated liquid level gauge formed on said front wall.

2. For use in a windshield clearing system for a vehicle, an upright fluid container attachable at the upper end thereof to the vehicle, said container including a front wall and a back wall having their corresponding edges in fluid sealed engagement, with said back wall being constructed of a non-stretchable material and said front wall being constructed of a stretchable and flexible material whereby when said container is filled with fluid, said front wall yields forwardly to accommodate the fluid in the container while the back wall retains its shape to thereby prevent the container from sagging, and a pair of fluid connections formed integral with said container adjacent the sealed edges of said front and back walls, with one of said connections being connectible in the clearing system and the other of said connections being located at the top ends of said walls and constituting a filling opening for said container.

References Cited in the file of this patent
UNITED STATES PATENTS

| | | |
|---|---|---|
| 901,695 | Davis | Oct. 20, 1908 |
| 994,287 | Thorning | June 6, 1911 |
| 1,341,157 | Sublett | May 25, 1920 |
| 1,390,718 | Lover | Sept. 13, 1921 |
| 1,715,740 | Cervelli | June 4, 1929 |
| 2,019,197 | Spanel | Oct. 29, 1935 |
| 2,072,225 | Slater | Mar. 2, 1937 |